United States Patent Office 3,283,062
Patented Nov. 1, 1966

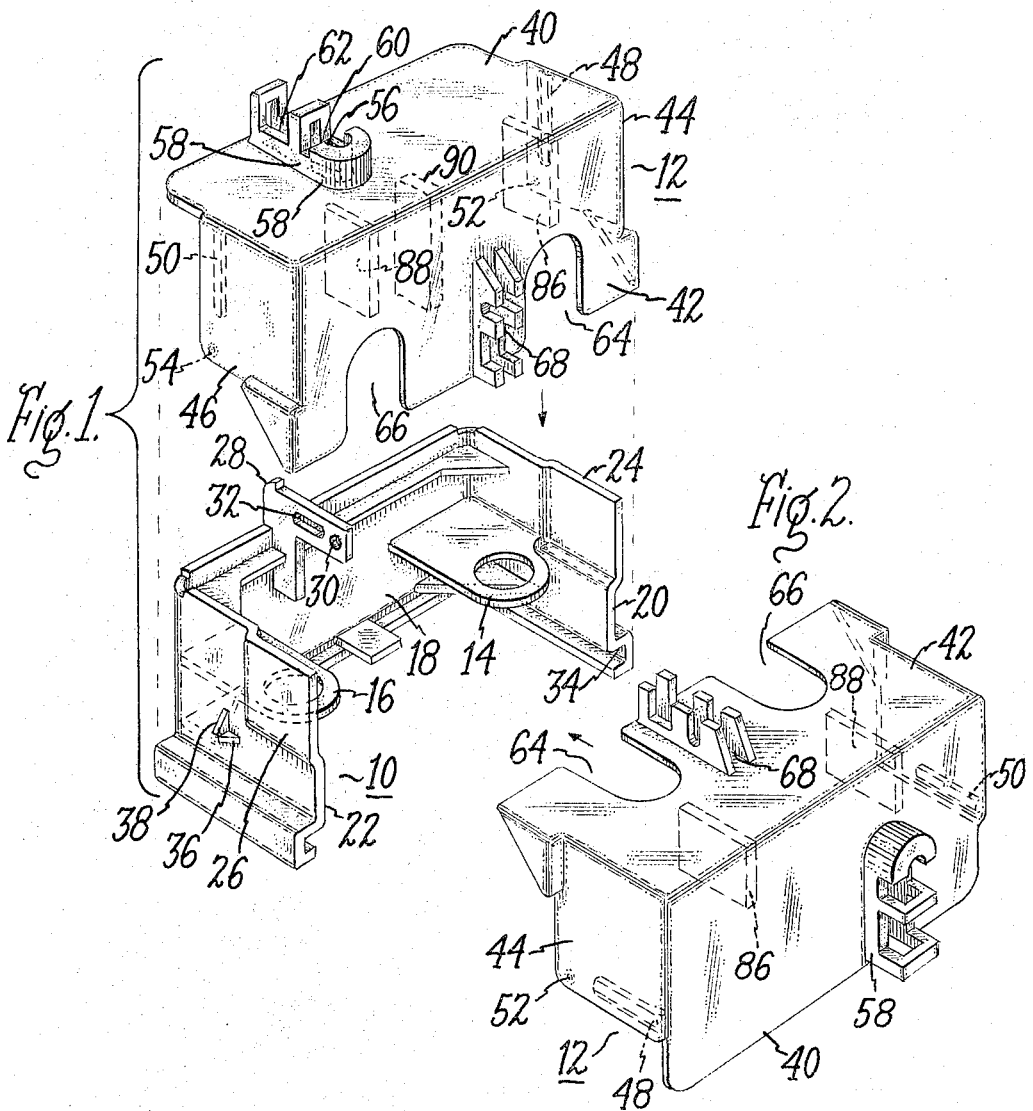

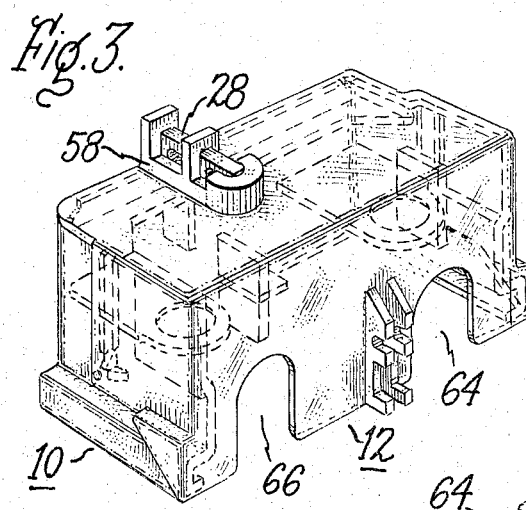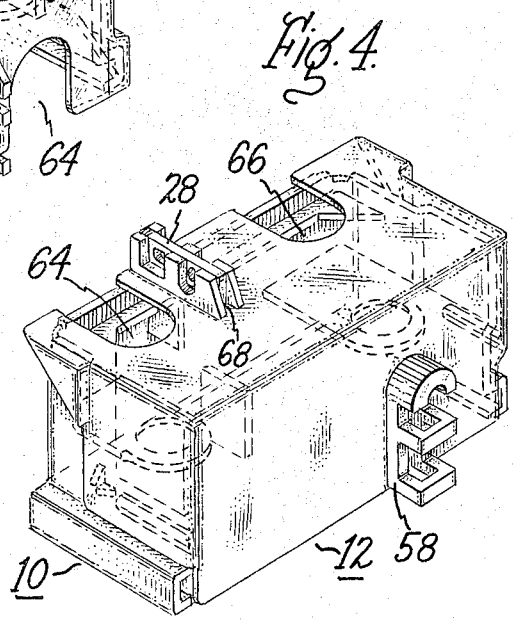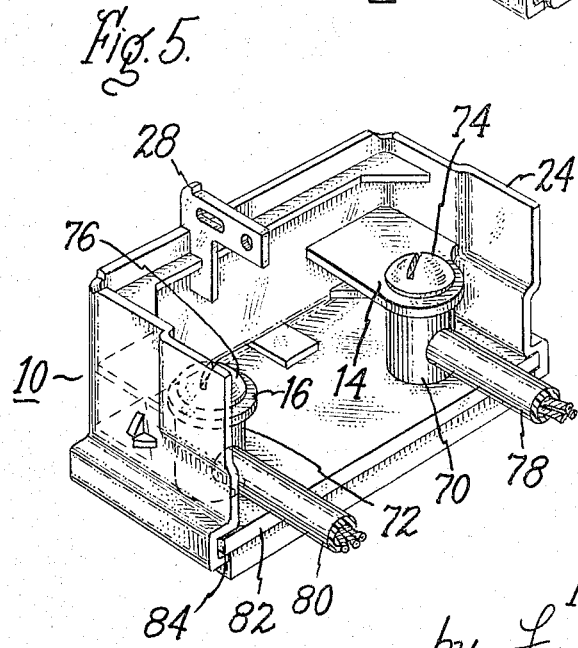

3,283,062
TERMINAL ENCLOSURE
Franklin R. D'Entremont, Dover, N.H., assignor to General Electric Company, a corporation of New York
Filed Aug. 31, 1965, Ser. No. 484,015
3 Claims. (Cl. 174—138)

This invention relates to instrument transformers and more particularly it relates to a terminal enclosure for the secondary terminals of instrument transformers.

In the instrument transformer field it has long been the practice to provide terminal enclosures for the secondary terminals of instrument transformers. These enclosures are provided to secure the connections to the secondary terminals and prevent tampering with such connections. The enclosures are also considered desirable to shield the secondary terminals from exposure to the elements and also to prevent persons or metallic objects from coming in contact with the secondary terminals. As will be understood, the secondary terminals of an instrument transformer could, under some circumstances, provide a lethal shock to a person contacting them. Of course, should a metallic object contact the terminals the secondary of the transformer would be shorted with possible damage to the transformer or the instruments connected thereto.

Many types of secondary terminal covers have been used previously. One example of a secondary terminal enclosure is disclosed in Patent No. 2,800,525. However, many of the terminal enclosures presently available are designed for use with a single terminal and also do not enable the closing off of the terminals when the transformer is not in use. It is considered desirable in the instrument transformer field to provide a terminal enclosure which may be used jointly with both secondary terminals and which performs the dual function of enclosing the terminals when secondary leads are connected thereto and which may also be used to close off the secondary terminals when the transformer is not in use. It is also considered desirable that the terminal enclosure be transparent so that the condition of the connection to the secondary terminals may be determined without removing the enclosure.

It is, therefore, one object of this invention to provide a novel secondary terminal enclosure for instrument transformers.

A further object of this invention is to provide a two position enclosure for the secondary terminals of an instrument transformer.

Still another object of this invention is to provide a terminal enclosure for the secondary terminals of an instrument transformer in which the enclosure is made of transparent plastic material.

A still further object of this invention is to provide a novel secondary enclosure which may be secured in a lead-connected position or in a lead disconnected position.

In carrying out this invention in one form, a terminal enclosure is provided which comprises a pair of cooperating members, one cooperating member comprises a three-sided member having portions adapted to be connected to the secondary terminals of an instrument transformer to fix this first member to such secondary terminals. The second member comprises a substantially four-sided member having portions which slidably engage portions of the first member in either of two positions. The second member is also provided with openings to allow passage of secondary leads. In the preferred form of the invention a locking tab is provided on the first member which cooperates with either of a pair of slots in the second member to allow a seal strip or seal wire to hold the cooperating members in assembled condition.

The invention which is sought to be protected will be particularly pointed out and distinctly claimed in the claims appended hereto. However, it is believed that the invention and the manner in which its various objects and advantages are obtained, as well as other objects and advantages thereof, will be more clearly understood from the following detailed description of a preferred embodiment thereof particularly when considered in the light of the accompanying drawings, in which:

FIGURE 1 is an exploded, perspective view showing the cooperating members of the terminal enclosure according to the preferred embodiment of this invention;

FIGURE 2 is a perspective view of the movable member of the terminal enclosure of this invention showing an alternate position of the movable member with respect to the fixed member of the enclosure shown in FIG. 1;

FIGURE 3 is a perspective view of the terminal enclosure in a closed position in which the secondary terminals may be connected to secondary leads;

FIGURE 4 is a perspective view of the terminal enclosure in the closed position in which secondary leads cannot be connected to the secondary terminals; and FIGURE 5 is a partial perspective view showing the fixed member of the terminal enclosure of this invention attached to the secondary terminals of a transformer.

Referring now to the drawings in which like numerals are used to indicate like parts throughout the various views thereof, and considering specifically FIG. 1, an exploded, perspective view of a preferred embodiment of the terminal enclosure is shown. As shown, the terminal enclosure includes a pair of cooperating members 10 and 12. Member 10 is the fixed member of the terminal enclosure, while member 12 is the movable member of the terminal enclosure, which is slidably received by member 10 to complete the enclosure in the manner specifically shown in FIGS. 3 and 4. The fixed member 10, in the preferred form shown, comprises a three-sided member having tabs 14 and 16 extending from the rear portion 18 and along the opposite side members 20 and 22 in the manner shown. As will be more clearly indicated hereafter, tabs 14 and 16 are utilized to fixedly attach fixed member 10 to the secondary terminals of a transformer. Substantially square raised portions 24 and 26 are provided on sides 20 and 22, respectively, in the manner shown. Also a locking tab 28 is provided on the top portion of rear 18, such tab being provided with a hole 30 and a slot 32 for receiving respectively a sealing wire and a sealing strip. The fixed member 10 is provided with a groove 34 extending along the base of sides 20, 22 and rear 18, as shown. As will be more clearly described hereafter, groove 34 may be used for engagement with the base portion of a secondary terminal plate. Each of sides 20 and 22 is provided with a pair of triangularly shaped cams 36 and 38 at right angles to each other as is clearly apparent on side 22 in FIG. 1. As can be seen, cam 36 is inclined toward the end of side 22 and cam 38 is inclined toward the top of side 22.

The movable member 12 of the terminal enclosure comprises a four-sided member including top 40, front 42 and sides 44 and 46. Movable member 12 slides in engagement with member 10 and is provided with raised portions 48 and 50 on the inner surface of each of sides 44 and 46, respectively, as is shown. As will be apparent raised portion 48 on side 44 cooperates with one side of the raised portion 24 on side 20, while in a similar manner portion 50 cooperates with a side of portion 26. As will be apparent from FIG. 1, the movable member 12 may be slid over the fixed member 10 with raised portions 48 and 50 cooperating with raised portions 24 and 26 providing a sliding engagement between the fixed and movable members 10 and 12. To provide a snapping lock means, dimples 52 and 54 are provided on the inner surface of sides 44 and 46 as shown. In the position of the members shown in FIG. 1, dimple 54 will ride over the inclined surface of cam 38 with the flexing of side 46, the dimple snapping back of cam 38 to form a snap lock. In a similar manner dimple 52 will cooperate with cam 38 on side 20. Further, movable member 12 is provided with an open slot 56 on the upper surface 40. The slot 56 is positioned to receive tab 28. Slot 56 is provided with raised sides 58 having openings 60, 62 therethrough. Opening 60 cooperates with hole 30 to allow a sealing wire to lock members 10 and 12 in closed position. In a similar manner opening 62 cooperates with slot 32 to allow a sealing strip to be used. The front side 42 of movable member 12 is provided with openings 64 and 66 which allow passage of the secondary terminal wires. Side 42 is also provided with a slot 68 which functions in the same manner as slot 56, as will be discussed next.

FIGURE 2 of the drawings shows movable member 12 in an alternate position in which member 12 may be slid onto fixed member 10 from the side direction instead of the top. In this position side 40 becomes the front of the enclosure, while side 42 becomes the top of the enclosure. As will be apparent from FIG. 2, slot member 68 must be opened at the edge of side 42 so that tab 28 may readily slide within the slot 68. When movable side 12 is placed on fixed member 10 in this manner the dimple 52 on side 44 will cooperate with cam 36 on side 22, while dimple 54 on side 46 will cooperate with the cam 36 on side 20 to provide a snap lock. Of course, raised portions 48 and 50 are now reversed, that is, raised portion 48 now cooperates with raised portion 26 while raised portion 50 cooperates with raised portion 24. However, it will be readily apparent that by turning movable member 12 in the manner shown in FIG. 2 a sliding fit is obtained with fixed member 10 with the openings 64 and 66 substantially 90° removed from their position in FIG. 1.

FIGURE 3 shows the fixed member 10 and movable member 12 in the closed position wherein openings 64 and 66 allow access for terminal leads to the secondary terminals. The cooperation of tab 28 and slot 56 with sides 58 to lock the members in this closed position is readily apparent. In FIG. 4 members 10 and 12 are shown in the closed position with the openings 64 and 66 on the upper portion of the enclosure and in a position which substantially prevents access to the secondary terminals. The cooperation of tab 28 with slot 68 clearly appears from FIG. 4.

FIGURE 5 shows the use of tabs 14 and 16 in cooperation with a pair of secondary terminals 70 and 72. As shown in FIG. 5, tabs 14 and 16 are securely locked to the secondary terminals 70 and 72 by snapping over the secondary terminals 70, 72. As shown, secondary terminals 70, 72 are provided with secondary terminal screws 74 and 76. The secondary leads 78 and 80 are shown and, as will be understood, these secondary leads will extend through openings 64 and 66 when movable member 12 is placed on fixed member 10 in the manner shown in FIG. 3. As also will be seen, the secondary terminals 70 and 72 are provided with a base portion 82 having a rim 84 which cooperates with the groove 34 in fixed member 10 to aid in securing fixed member 10 to the secondary terminals.

As will be understood, it is desirable that the condition of the secondary terminals, either their connection, or the shorting thereof, be visible through the secondary terminal enclosure. For this reason it is preferred to make both members 10 and 12 of a transparent plastic material. An example of a preferred type of material is polycarbonate resin sold under the trademark Lexan.

The terminal enclosure of this invention has particular utility when used with the shorting device described and claimed in application Serial No. 484,037 filed concurrently herewith in the name of Reuel L. Davis and assigned to the same assignee as this application. The terminal enclosure may be provided with a tab, such as tab 90, on movable member 12 (see FIG. 1) which will prevent placing the movable member 12 on member 10 as in FIG. 3 unless the shorting device is in the proper position.

The terminal enclosure may also be provided with tabs such as tabs 86 and 88 on movable member 12 (FIG. 2) which will prevent placing the movable member 12 on member 10 in its alternate position as in FIG. 4 if the terminal screws 74 and 76 are unscrewed enough to connect a wire in terminals 70 and 72.

From the above it will be apparent that by means of this invention there is provided a two-part secondary terminal cover which may be readily used to enclose secondary terminals of a transformer in either of two positions. While the preferred form of the invention is shown as connected to the particular type of secondary terminal base shown in 82 in FIG. 5, it will of course be evident that it may be used in conjunction with other types of secondary terminals such as, for example, the secondary terminals disclosed in application Serial No. 334,833 filed December 31, 1963 in the name of the same inventor as this application and assigned to the same assignee as this application. Obviously, many changes may be made in various details of the preferred embodiment of this invention without departing from the spirit and scope thereof, particularly as it is defined in the appended claims.

What is claimed as new and which it is desired to secure by Letters Patent of the United States is:

1. A terminal enclosure for secondary terminals comprising, in combination, a pair of cooperating members, one member being a fixed member and including tab means extending from a wall thereof for fixing said fixed member to secondary terminals, raised portions on said fixed member substantially square-shaped for slidably receiving a second member, said second member being a movable member and provided with raised portions which cooperate with said square-shaped raised portions of said fixed member to slidably engage said fixed member in either of two positions, said movable member having openings in one side for passage of secondary terminal leads.

2. A terminal enclosure as claimed in claim 1 in which said fixed member has a pair of cams on each end thereof, at substantially 90° angular relation and said movable member is provided with a dimple on opposite ends thereof, said dimples cooperating with said cams when said movable member is mounted on said fixed member in either of two positions to provide a snap lock when said fixed and said movable member are engaged.

3. A terminal enclosure for secondary terminals comprising, in combination, a pair of cooperating members, one member being a fixed member and having a back and two sides thereof, each side being provided with substantially square-shaped raised portions for slidably receiving a second member, said back provided with a tab device, said fixed member including means for fixing said fixed member to secondary terminals, said second member being a movable member provided with a front and top and two sides, said sides having a pair of raised portions cooperating with said square-shaped raised portions on said fixed member to slidably engage said fixed member in either of two positions, said front being provided with a pair of openings to allow passage of secondary terminal leads and said front and said top having locking slots therein, one of said locking slots cooperating with said locking tab on said fixed member when said movable member is mounted on said fixed member in either of two positions.

References Cited by the Examiner

UNITED STATES PATENTS

| | | |
|---|---|---|
| 2,510,745 | 6/1950 | Kilgore _____ 174—67 |
| 2,590,559 | 3/1952 | Miller. |
| 2,670,870 | 3/1954 | Fleischer. |
| 2,740,001 | 3/1956 | Vergilio et al. _____ 174—138 |
| 3,112,148 | 11/1963 | Wochner _____ 174—138 X |

FOREIGN PATENTS

| | | |
|---|---|---|
| 595,916 | 7/1925 | France. |
| 530,353 | 12/1940 | Great Britain. |

OTHER REFERENCES

Electrical World, Sept. 22, 1952, page 139.

LARAMIE E. ASKIN, *Primary Examiner.*